No. 836,337. PATENTED NOV. 20, 1906.
J. C. M. PASSERON.
ELASTIC WHEEL.
APPLICATION FILED DEC. 6, 1905.
FIG_1
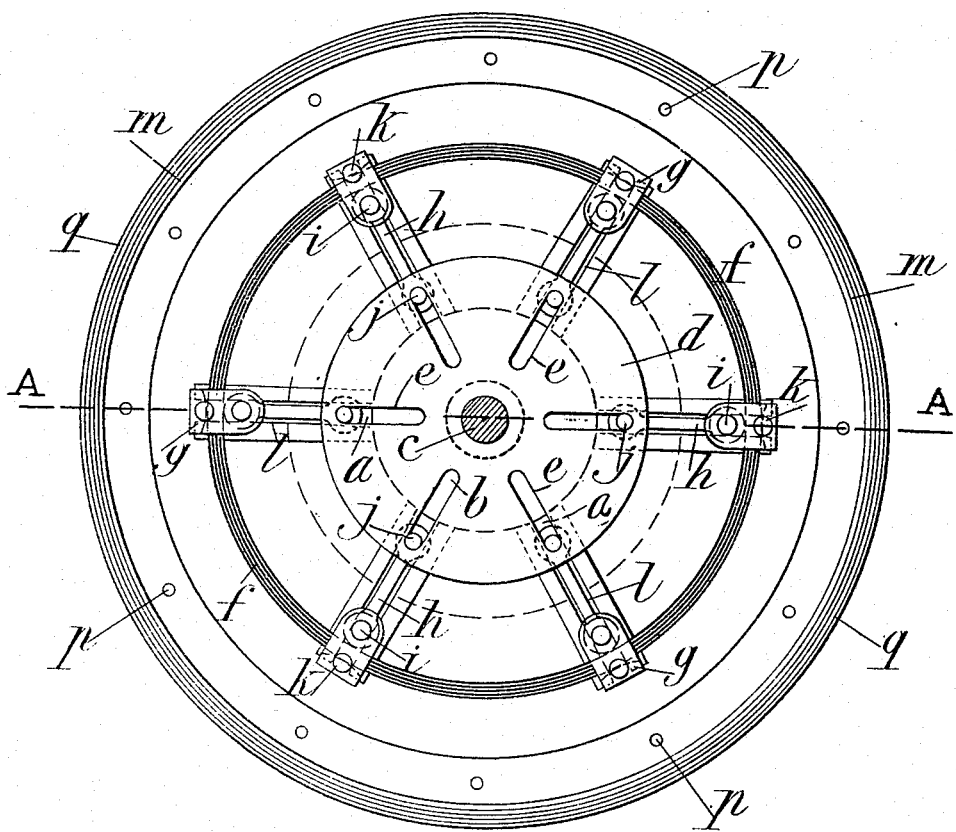
FIG_2
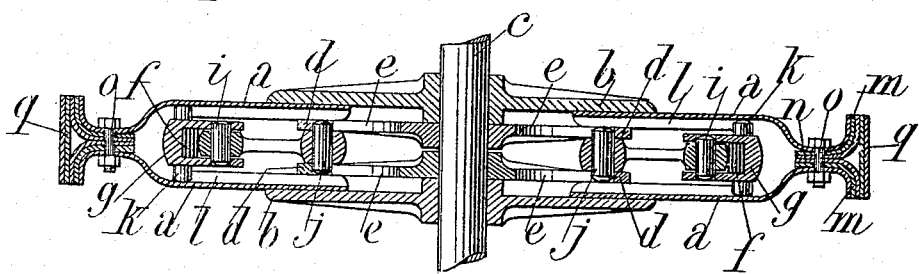
Witnesses:
R. Downie
John A. Percival.
Inventor
Jean Claude Marie Passeron
BY Richardo
ATTORNEYS

UNITED STATES PATENT OFFICE.

JEAN CLAUDE MARIE PASSERON, OF LYON, FRANCE.

ELASTIC WHEEL.

No. 836,337.  Specification of Letters Patent.  Patented Nov. 20, 1906.

Application filed December 6, 1905. Serial No. 290,614.

*To all whom it may concern:*

Be it known that I, JEAN CLAUDE MARIE PASSERON, a citizen of France, residing at Lyon, Rhône, France, have invented new and useful Improvements in Elastic Wheels, of which the following is a specification.

The present invention relates to a new arrangement applied to the construction of wheels for various vehicles, and has for its object to avoid the inconveniences arising from the use of pneumatic tires, which object is attained by the construction of a special form of wheel in which the usual air-tube and india-rubber outer cover are dispensed with, the desired elasticity being obtained by the employment of an elastic bed between the felly and the axle and avoiding, or at least reducing, the vibrations and jolts communicated to the vehicle by the inequalities of the road upon which the wheel runs. Further, the wheel is retained in its field of rotation.

The type of wheel represented on the accompanying drawings is applicable to wheels for all kinds of vehicles. The wheel represented is supposed to be without weight thereon.

Figure 1 is an elevation of the wheel with parts removed. Fig. 2 is a horizontal section drawn on the line A A of Fig. 1.

One of the disks $b$ and one of the rings $a$, forming the body of the wheel and shown in Fig. 2, are supposed to be removed in Fig. 1 in order to render visible the arrangement forming the elastic bed which is contained in the interior of the rings $a\ a$, which latter are fixed one to the other and are capable of sliding against the inner faces of the disks $b\ b$, forming the hub of the wheel and which are keyed on the axle $c$, as are also the disks $d\ d$, within which radial slots $e$ are formed, those in one disk being placed opposite those in the other.

The elastic bed consists, essentially, of a spring $f$, formed of a band or ribbon of steel or other metal coiled in a circle around itself. It passes between the clips $g$, which retain it in position without in any way preventing its free motion, as it is not in any way fixed to these clips, the number of which latter may vary according to requirements. To each of these clips $g$ is connected a small connecting-rod $h$, by means of a pin $i$, which is flush with the exterior faces of the clip. Each connecting-rod $h$ carries another pin $j$ of sufficient length to be capable of entering the slots $e$, within which it can slide with slight friction, being flush with the exterior faces of the disks $d$. There are of course as many slots $e$ in each of the disks $d$ as there are connecting-rods $h$ in the arrangement. Each of the clips $g$ can only move in a rectilinear radial direction in consequence of the trunnions $k$, which are solid with the clip and are each guided in a groove $l$, located on the inner face of the corresponding ring $a$.

The body in two pieces, constituted by the rings $a$, is of the form indicated by Fig. 2, and its periphery is constructed to hold in position a leather tire formed of a ring $q$, fixed to two rings $m\ m$, the curved portions $n\ n$ of which are retained in contact and gripped between the two rings $a\ a$, which at this place are brought nearer together.

The perfect fixing of the tire, which may be furnished with any known protector, is obtained by the employment of nuts and bolts, such as $o$, the stems of which pass through the rings $a$ and the parts $n$ of the tire passing through the holes $p$. (Indicated at Fig. 1.)

Any arrangement of felly and tire can be connected to the rings $a\ a$; but the arrangement above described is very solid and sufficiently elastic, supposing it to be placed on a wheel furnished with the arrangement of elastic bed, of which the different pieces of mechanism are above described, and the operation of which is as follows: When the load is on the wheel, the axle carries forward the pins $j$ of the connecting-rods $h$, which are at the upper part of the wheel. Each of these connecting-rods in its turn carries forward the clip to which it is connected by means of one of the pins $i$. This clip draws with it the spring $f$, which passes through it. This spring is bent to an amount determined by each load imposed. It is when one of the clips passes the most elevated position of the curve described by it that its pressure on the spring is the greatest. This spring by its elasticity will gradually return the clip in question to its primitive position (represented on the drawings) in proportion as the load being less normal will weigh less upon it. It will be readily understood that when the wheel receives shocks one or several clips, according to their position at the moment, will act upon the spring, thereby reducing or preventing shocks.

This system of wheel presents numerous advantages, among which I would mention, above all, a great elasticity given to the axle of the wheel, which, receiving little or scarcely any vibrations, will offer much less chance of breakage, and consequently greater security. I obtain in addition the suppression of the pneumatic tire and of the ordinary springs of vehicles. The construction indicated offers the great advantage of completely protecting the mechanism of the elastic bed from dust and dirt, which might clog it. Further, each ring $a$ is always held between a disk $b$ and a disk $d$, against which it can slide, and this arrangement gives a very great rigidity to the wheel; but it should be understood that for the construction of all the arrangement devised any suitable materials may be employed, according to the nature of the application. The dimensions of the parts and the details of construction may vary, and particularly the size. The thickness of the metallic ribbon forming the spring and the number of coils should be determined with relation to the load which the wheel will support.

Having fully described my invention, what I claim is—

1. In a wheel for vehicles, an elastic bed consisting of a metallic spring $f$ concentric with the wheel when the latter is not loaded and attached to the axle by an arrangement of connecting-rods $h$, each of which is connected to a clip $g$ these connecting-rods and clips being capable of moving only in radial directions guided by pins $j$ and trunnions $k$, the pins $j$ sliding within slots $e$ formed in two disks $d$ keyed on the shaft, and the trunnions $k$ sliding in grooves $l$, formed in the two rings $a$ substantially as herein set forth.

2. In a wheel for vehicles an elastic bed consisting of a metallic spring $f$ concentric with the wheel when the latter is not loaded and attached to the axle by an arrangement of connecting-rods $h$ each of which is connected to a clip $g$ these connecting-rods and clips being capable of moving only in radial directions guided by pins $j$ and trunnions $k$, the pins $j$ sliding within slots $e$ formed in two disks $d$ keyed on the shaft, and the trunnions $k$ sliding in grooves $l$, formed in the two rings $a$ and means for attaching the external tire which latter has the general form of a T and is held in position by the rings $a$ between which is gripped the part forming the vertical arm of the T substantially as herein set forth In testimony whereof I have signed my name to this specification in the presence of two subscribing witnesses.

JEAN CLAUDE MARIE PASSERON.

Witnesses:
 HENRI SUPÉRY,
 GASTON JEAUNIAUX.